(No Model.)

F. W. BRITTIN.
CARVING FORK.

No. 370,236.  Patented Sept. 20, 1887.

Witnesses:
E. C. Perkins.
E. E. Ruggles.

Inventor,
Frederick W. Brittin
By A. M. Wooster
atty

UNITED STATES PATENT OFFICE.

FREDERICK W. BRITTIN, OF BIRMINGHAM, CONNECTICUT, ASSIGNOR TO THE SILVER PLATE CUTLERY COMPANY, OF SAME PLACE.

CARVING-FORK.

SPECIFICATION forming part of Letters Patent No. 370,236, dated September 20, 1887.

Application filed June 1, 1886. Serial No. 203,724. (No model.)

*To all whom it may concern:*

Be it known that I, FREDERICK W. BRITTIN, a citizen of the United States, residing at Birmingham, in the county of New Haven and State of Connecticut, have invented certain new and useful Improvements in Carving-Forks; and I do hereby declare the following to be a full, clear, and exact description of the invention, such as will enable others skilled in the art to which it appertains to make and use the same.

My invention has for its object to produce a carving-fork the guard of which shall be so constructed that it will draw the skewers from a piece of meat without the necessity of touching them with the fingers. In order to accomplish this result and produce a carving-fork that will meet the requirements of the trade, will be attractive to the eye, and inexpensive to produce, I have devised the novel construction of which the following description, in connection with the accompanying drawings, is a specification, numbers being used to indicate the several parts of the device.

Figure 1:
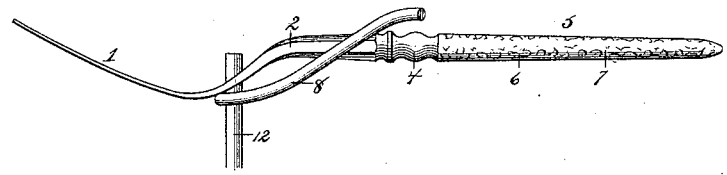
Figure 2:
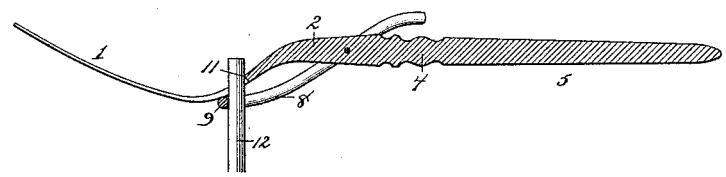
Figure 3:
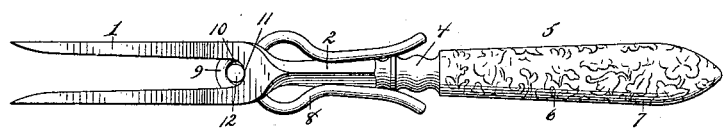
Figure 4:
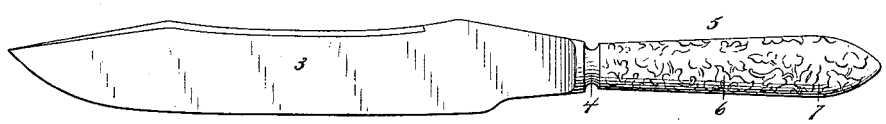

Figure 1 is an elevation of my improved fork, illustrating the manner in which it grasps a skewer; Fig. 2, a longitudinal section corresponding therewith, illustrating the bearing-point upon a skewer and the construction of the fork itself; Fig. 3, a plan view of the fork in the act of drawing a skewer, and Fig. 4 is an elevation of a carving-knife designed to accompany my improved fork when placed upon the market.

1 denotes the tines of a fork; 2, the shank; 4, the bolster, which may be varied in design to suit the taste of the manufacturer or the market, and 5 the handle.

It will of course be understood that my invention is applicable to all classes of forks. I have illustrated it in connection with a style of fork which I preferably use—that is, a fork in which the tines, bolster, and handle are forged from a single piece of metal, the handle portion being provided with raised figures, whereby it may be held firmly in use.

8 indicates the guard, which may be of any preferred construction, and is ordinarily secured by pivoting to the shank of the fork. It is of course well understood that these guards, as ordinarily constructed, are capable of being turned at any angle to the shank, and serve to protect the hand during certain operations of carving, and also as a rest to prevent the tines of the fork and the blade of the knife from soiling the table-cloth after they have been used.

The essential feature of my invention is that I provide the forward end of the guard with a loop, 9, which, when the guard is in the lowered position, projects forward a short distance beyond the point at which the bases of the tines join the shank, leaving an opening, 10, which is closed upon one side by the bases of the tines and upon the other side by the loop of the guard. At the point of intersection of the bases with the tines I preferably provide an angular shoulder, 11, which engages the skewer, as is clearly shown in Fig. 2.

The operation of my invention will be clearly understood from the drawings. The fork is held the reverse of the ordinary position in carving, and the end of the skewer (indicated by 12) is allowed to pass through the opening between shoulder 11 and the loop just far enough to permit the shoulder to engage it. The handle of the fork is then raised, which causes the skewer to be firmly clamped between the loop and the shoulder, so that it may be easily withdrawn, the principle being that of a lever of the second class, the piece of meat serving as a fulcrum upon which the tines rest.

The result of my improvement is that I produce a fork and guard so constructed that a skewer may be drawn without difficulty and without soiling the fingers in the slightest.

It will of course be understood that the details of construction may be varied to an almost unlimited extent without departing from the spirit of my invention.

I claim—

A carving-fork having a shoulder, 11, formed at the intersection of the tines, in combination with a guard having a loop, 9, adapted to project beyond said shoulder and to form in connection therewith an opening, 10, to receive and clasp the ends of the skewers, whereby the latter may be drawn.

In testimony whereof I affix my signature in presence of two witnesses.

FREDERICK W. BRITTIN.

Witnesses:
 A. B. RUGGLES,
 A. J. RUGGLES.